United States Patent
Contri

(10) Patent No.: US 10,473,433 B2
(45) Date of Patent: Nov. 12, 2019

(54) BULLETPROOF PROTECTION STRUCTURE AND CORRESPONDING BULLETPROOF VEST

(71) Applicant: ELET.CA S.r.l. con Socio Unico, Gazoldo degli Ippoliti (MN) (IT)

(72) Inventor: Alberto Contri, Signa (IT)

(73) Assignee: ELET.CA S.R.L. CON SOCIO UNICO, Gazoldo degli Ippoliti (MN) (IT)

( * ) Notice: Subject to any disclaimer, the term of this patent is extended or adjusted under 35 U.S.C. 154(b) by 0 days.

(21) Appl. No.: 14/967,859

(22) Filed: Dec. 14, 2015

(65) Prior Publication Data
US 2016/0349014 A1  Dec. 1, 2016

(30) Foreign Application Priority Data
May 28, 2015  (IT) .................. 102015000019024

(51) Int. Cl.
*A41H 1/00* (2006.01)
*F41H 1/02* (2006.01)
(Continued)

(52) U.S. Cl.
CPC ............. *F41H 1/02* (2013.01); *B32B 3/16* (2013.01); *B32B 5/024* (2013.01); *B32B 9/005* (2013.01); *F41H 5/0492* (2013.01); *B32B 2260/00* (2013.01); *B32B 2262/0253* (2013.01); *B32B 2307/558* (2013.01); *B32B 2437/00* (2013.01); *B32B 2571/02* (2013.01)

(58) Field of Classification Search
CPC .. F41H 1/02; B32B 9/005; B32B 3/16; B32B 5/024; B32B 2262/0253; B32B 2437/00; B32B 2571/02; B32B 2307/558; B32B 2260/00
See application file for complete search history.

(56) References Cited

U.S. PATENT DOCUMENTS 5,738,925 A     4/1998  Chaput
7,150,217 B2 *  12/2006 Kershaw ............... A41D 13/05
                                              2/2.5
(Continued)

FOREIGN PATENT DOCUMENTS

EP   0 967 453 A1   6/1998
EP   1 980 813 A2   3/2008
(Continued)

OTHER PUBLICATIONS

European Search Report dated Sep. 20, 2016 issued in corresponding European Application No. 16 17 1122.
(Continued)

*Primary Examiner* — Khaled Annis
(74) *Attorney, Agent, or Firm* — Nath, Goldberg & Meyer; Jerald L. Meyer; Stanley N. Protigal

(57) ABSTRACT

A bulletproof protection structure comprises at least a flexible base and a reinforcing structure realized by means of at least one ballistic panel associated with the flexible base. The ballistic panel is finely divided into a plurality of elementary components, individually associated with the flexible base, structurally independent of one another and not bound to each other, so as to ensure flexibility for the structure as a whole.

27 Claims, 7 Drawing Sheets

(51) Int. Cl.
 *F41H 5/04* (2006.01)
 *B32B 3/16* (2006.01)
 *B32B 5/02* (2006.01)
 *B32B 9/00* (2006.01)

(56) References Cited

U.S. PATENT DOCUMENTS

| | | | |
|---|---|---|---|
| 8,459,168 B2* | 6/2013 | Hirschberg | F41H 5/0492 89/36.05 |
| 8,702,895 B2* | 4/2014 | Turner | A41D 13/0156 156/297 |
| 2004/0020353 A1* | 2/2004 | Ravid | F41H 5/023 89/36.02 |
| 2008/0236378 A1 | 10/2008 | Sane et al. | |
| 2009/0145289 A1* | 6/2009 | Cohen | F41H 5/0492 89/36.02 |
| 2011/0239346 A1* | 10/2011 | Doherty | A41D 13/0058 2/2.5 |
| 2012/0096703 A1* | 4/2012 | Zachau | B32B 7/005 29/592 |
| 2012/0312150 A1 | 12/2012 | Gamache et al. | |
| 2013/0199712 A1 | 8/2013 | Gendlin et al. | |
| 2015/0082523 A1* | 3/2015 | Wyner | B32B 3/04 2/455 |
| 2015/0268010 A1* | 9/2015 | Strauss | F41H 7/044 89/36.02 |
| 2015/0362293 A1* | 12/2015 | Strauss | F41H 5/0414 89/36.01 |

FOREIGN PATENT DOCUMENTS

| | | |
|---|---|---|
| EP | 2 682 707 A1 | 12/2011 |
| EP | 2 444 247 A1 | 4/2012 |
| WO | 2006/096616 A2 | 9/2006 |
| WO | 2009/095903 A1 | 8/2009 |

OTHER PUBLICATIONS

Search report issued in corresponding Italian application No. 102015000019024 dated Jan. 29, 2016.

* cited by examiner

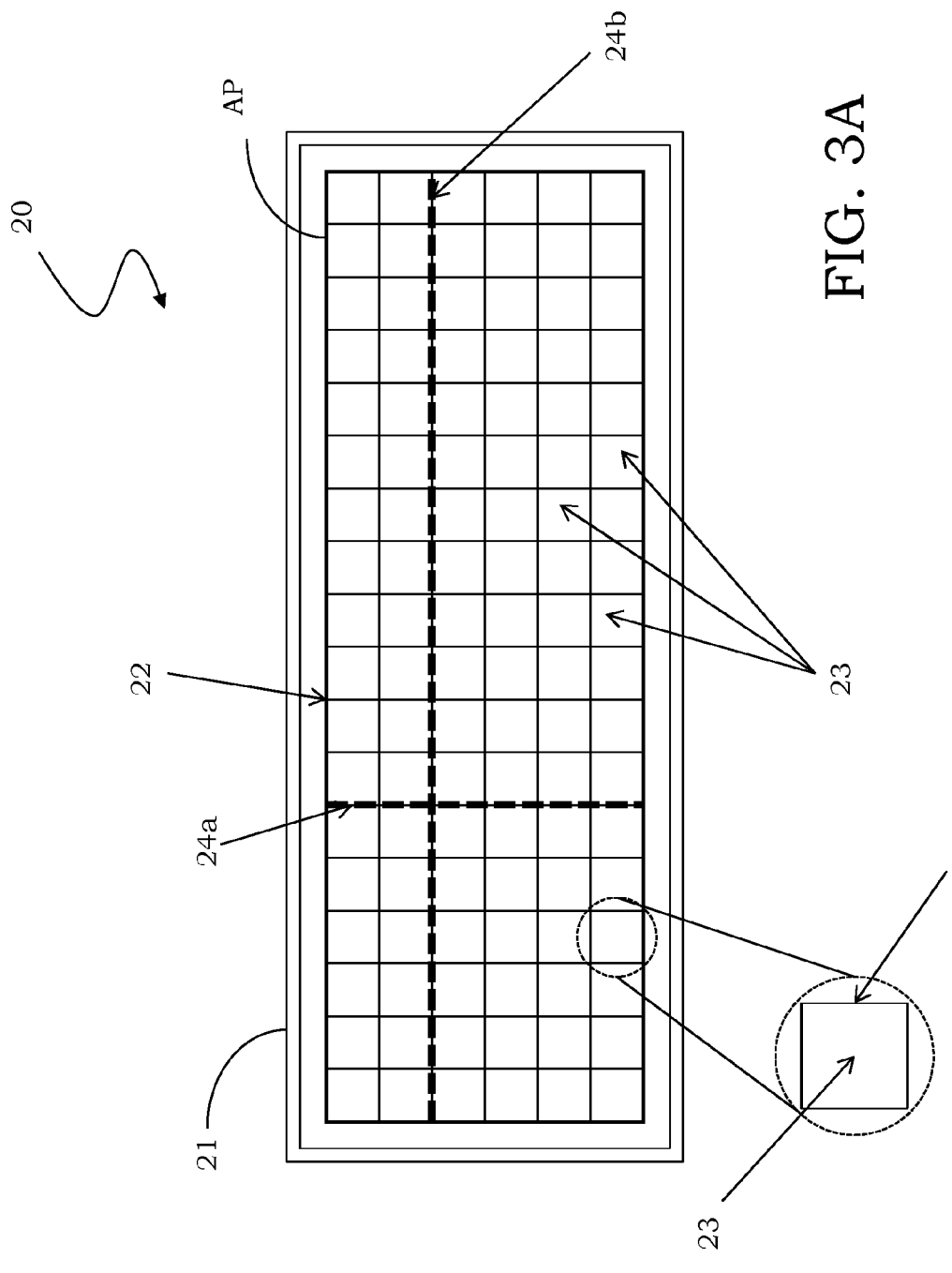

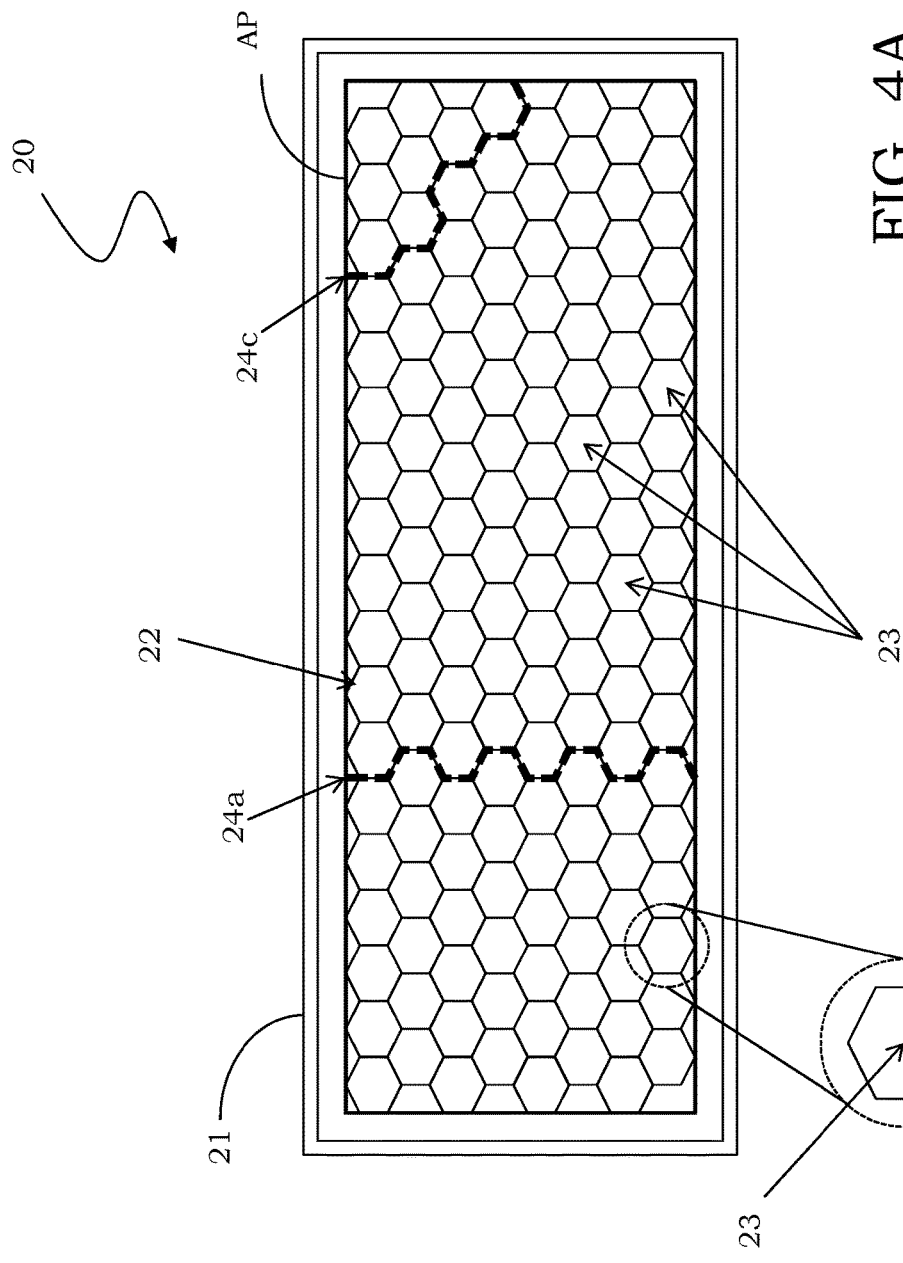

BULLETPROOF PROTECTION STRUCTURE AND CORRESPONDING BULLETPROOF VEST

FIELD OF THE INVENTION

The present disclosure relates to a bulletproof protection structure.

The disclosure relates, in particular, but not exclusively, to a protection structure suitable for making bulletproof vests able to ensure high levels of protection, in particular higher than a IIIa of the United States NIJ standard, and the description which follows is made with reference to this field of application with the sole object of simplifying the illustration thereof.

BACKGROUND OF THE INVENTION

It is known to obtain effective bulletproof protection thanks to structures which are realized by means of suitable combinations of interwoven fibers able to absorb and disperse the stopping force and penetration of the bullets by means of plastic deformation (elongation) of said fibers.

The number of superimposed layers determines the protective capacity of the structure as a whole, which is categorized for example in protection classes referred to as NIJ (United States) or SK (Germany).

These structures are generally formed by several layers of fibers which are interwoven or woven, in particular aramid fibers, and glued onto polyethylene films, in a final configuration which is in any case flexible. In general, these structures are made of high tenacity fibers, such as aramid fibers.

An aramid fiber has in fact a high mechanical tensile strength so much so that, for the same weight, it is five times stronger than steel; moreover such aramid fiber has a high heat and flame resistance, such that it is particularly suitable for use as a reinforcing fiber for the construction of extreme sports equipment and components used in aircraft, boats and racing cars, as well as military helmets and some articles of safety work clothing.

One of the most widely known applications of high tenacity fibers can be found in bulletproof vests: their high strength is used to absorb, by means of plastic deformation, the kinetic energy of the bullets, reducing to the minimum the effects on the user wearing the vest, in particular the so-called impact traumas and consequent bruising, internal lesions or even localized fractures, which are caused by transfer to the user's body of the energy absorbed by the fibers, net of that dispersed due to the plastic deformation thereof.

Normally the fiber structures are able to provide effective protection against bullets from short arms and to a limited extent automatic arms up to caliber 7.65 or 9 Parabellum, corresponding to 0.357 and 0.44 Magnum pistols and a speed of up to about 500 m/s. This corresponds to a protection level IIIa of the United States NIJ standard.

For protection against larger caliber bullets it is known to add to these fiber structures at least one semi-rigid or rigid ballistic panel able to break up the faster bullets (more than 700 m/s) into smaller parts which can be more easily stopped by the underlying fiber structure, owing to the reduction of their energy (divided up among the different fragmented parts). It is emphasized that the impact of bullets on this ballistic panel may in any case result in impact traumas.

In particular, these ballistic panels may be made of metallic materials and more often of so-called ballistic ceramic, namely a high-strength aluminum oxide able to break up the bullets and thus divide them into fragments. For this reason, these ballistic panels are made with fairly large thicknesses and in particular with thicknesses of between 5 and 12 mm, and preferably between 7 and 10 mm.

A bulletproof protection structure for calibers greater than 0.357 and 0.44 Magnum, namely higher than a level IIIa of the United States NIJ standard, realized according to the prior art is shown in schematic form in FIG. 1, denoted overall by 10.

A bulletproof protection structure 10 may for example be used for armoring vehicles and tanks.

The bulletproof protection structure 10, in the example shown purely by way of example, has a substantially rectangular form and comprises a fiber base 11 made for example using high tenacity fibers, which are for example interwoven, also referred to as ballistic fabric.

Such a bulletproof protection structure 10 also comprises a plurality of ballistic panels 12 associated with the fiber base 11, for example by gluing. In particular, the ballistic panels 12 may be made of ballistic ceramic.

As shown in the figure, the ballistic panels 12 may be suitably spaced so as to define, between two adjacent panels, at least a portion 13 of the fiber base 11 which is free from them and therefore allows folding over of the bulletproof protection structure 10 along folding lines indicated by 14.

The bulletproof protection structure 10 shown in FIG. 1 is thus able to cover a prism-shaped object, in particular with a square base, the ballistic panels 12 shown in the figure having the same sizes.

It is obviously possible to make the bulletproof protection structure 10 using ballistic panels 12 of different sizes, in particular able to follow the forms of the object to be covered and protected, as uniformly as possible. This complicates the protection of surfaces which are irregular and makes protection practically impossible in the case of rounded forms, such as cylindrical towers, leading to the imposition of square forms with corner edges. Moreover, the portions 13 devoid of the ballistic panels 12 are less protected and in particular may be penetrated by bullets of caliber greater than 0.357 and 0.44 Magnum, namely higher than a level IIIa of the United States NIJ standard. In these portions 13, in fact, the bulletproof protection is provided only by the fiber base 11.

This problem becomes even greater in the case of personal protective clothing which can be worn by a user, such as a bulletproof vest or jacket, in particular suitable for effective bulletproof protection against calibers greater than 0.357 and 0.44 Magnum, namely higher than a level IIIa of the United States NIJ standard.

The bulletproof vest is a garment, generally in the form of a waistcoat or jersey, which is used by armies and armed forces and is intended to protect the person wearing it against shots from firearms or shrapnel produced by explosives (in this latter case the vest is more commonly referred to as a "flak jacket"), said garment retaining the bullet or shrapnel inside it. This type of garment is also used by security staff, for example working at banks or responsible for the transportation of valuables.

Generally speaking a bulletproof vest is formed by an outer containment element, conveniently made of ballistic fabric, and one or more internal ballistic panels, for example made of ballistic ceramic.

These ballistic panels are in particular used as shields and are therefore normally positioned in front of the chest of the person and at the rear over the back and, in some cases, lower down, in the waist region around the right-hand and left-hand flanks, so as to ensure protection for the vital organs of the user wearing the jacket.

An example of a bulletproof vest, denoted overall by 15, is illustrated in schematic form in FIGS. 2A, 2B and 2C in a front view, view from above and cross-sectional view A-A, respectively.

The bulletproof vest 15 comprises a ballistic fabric portion 16, in particular made of high tenacity fibers, which are for example interwoven, and usually inserted inside a containment lining 17.

The bulletproof vest 15 shown in FIGS. 2A-2C is of the type suitable for providing bulletproof protection for calibers greater than 0.357 and 0.44 Magnum, namely higher than a level IIIa of the United States NIJ standard, and therefore comprises at least one ballistic panels 18 associated with the ballistic fabric portion 16, for example by means of gluing, and positioned over the chest of a user wearing the vest. It is also possible to envisage providing the containment lining 17 with a suitable pocket for inserting the ballistic panel 18.

It is also possible to provide the bulletproof vest 15 with further ballistic panels 19A and 19B which have smaller sizes than those of the ballistic panel 18 and are positioned symmetrically along the sides of this ballistic panel 18 on the lateral flanks of the vest, in the waist region of the user wearing it. The ballistic panels 19A and 19B may be also associated with the ballistic fabric portion 16 by gluing or inserted inside special pockets in the containment lining 17.

It is further possible to design the bulletproof vest 15 so as to have a ballistic panel positioned also on the back of the user wearing it, with sizes similar to those of the ballistic panel 18, and also envisage further ballistic panels, in particular with even smaller sizes than those of the ballistic panels 19A and 19B, for example in the waist region of the user wearing the vest (said panels not being shown in figures).

Obviously these ballistic panels constitute an impediment to the movement of the human body, limiting the freedom of movement of the user wearing the bulletproof vest 15. The user wearing the bulletproof vest 15 is for example prevented from performing movements of the torso, including lateral, forwards or backwards movements.

Another drawback resulting from the ballistic panels is also the weight of the bulletproof vest 15, this being a very constraining factor when choosing the protection which is most suitable for the missions to be carried out. A bulletproof vest 15 able to ensure bulletproof protection for a level IV of the United States NIJ standard may weigh up to 10 kg.

The known solutions, although advantageous under many respects, therefore have various drawbacks, including the difficulty of adapting the bulletproof protection structures for calibers greater than 0.357 and 0.44 Magnum, namely higher than a level IIIa of the United States NIJ standard, to surfaces which are not flat. Moreover, in the case of garments for bulletproof protection of persons, the use of ballistic reinforcing panels results in the extreme rigidity and additional weight of the garments, which limit the comfort of the person wearing them; moreover they are able to provide effective protection only for an area substantially limited to the zones of the vital organs, such as the heart, owing to at least one ballistic panel positioned over the chest of the user wearing the vest.

SUMMARY OF THE INVENTION

An embodiment of the present invention is directed to a bulletproof protection structure having a degree of flexibility sufficient for ensuring extensive coverage also of irregular surfaces, as in the case of a bulletproof vest to be worn, while at the same time increasing the level of protection up to calibers greater than 0.357 or 0.44 magnum, such as those of AK47 rifles and M2AP ammunition, namely higher than a level IIIa of the United States NIJ standard, so as to overcome the limitations and the drawbacks which hitherto affect the structures realised according to the prior art.

A ballistic panel is used as a reinforcing structure for a fabric portion, the ballistic panel being finely divided into a plurality of adjacent and structurally independent elements so as to provide the structure thus obtained with a sufficient degree of flexibility.

According to an aspect of the disclosure, a bulletproof protection structure comprises at least a flexible base and a reinforcing structure realized by means of at least one ballistic panel associated with the flexible base, wherein the ballistic panel is finely divided into a plurality of elementary components, individually associated with the flexible base, structurally independent of one another and not bound to each other, so as to ensure a flexibility for the structure as a whole.

According to another aspect of the disclosure, the elementary components may be associated with the flexible base in correspondence with at least one surface of maximum extension thereof.

Furthermore, according to yet another aspect of the disclosure, the elementary components may each have a surface extension smaller than a surface extension of the ballistic panel, preferably less than 20% of the surface extension of this ballistic panel, and even more preferably less than 2% of the surface extension of this ballistic panel.

According to another aspect of the disclosure, the number of the elementary components may be sufficient to achieve a substantially complete coverage of an area to be protected by means of the ballistic panel.

This bulletproof protection structure may in particular cover surfaces or structures with an irregular form.

According to another aspect of the disclosure, the elementary components may be made of a sintered material selected from aluminum oxide or carbides, such as silicon or boron carbide, to name a few.

Moreover, the elementary components may have a polygonal, preferably hexagonal, shape. These elementary components may in particular have sides with a length of between 10 mm and 50 mm, and preferably equal to 20 mm or 30 mm.

According to another aspect of the disclosure, the bulletproof protection structure may comprise at least a thermoplastic film for the association of the elementary components with the flexible base by means of gluing.

Furthermore, the flexible base may be made of ballistic fabric, in turn comprising fibers selected from high tenacity fibers and high molecular weight polyethylene.

A bulletproof vest comprising a flexible base and a reinforcing structure realized by means of a ballistic panel associated with the flexible base forming a bulletproof protection structure as defined above is also disclosed.

According to another aspect of the disclosure, the elementary components may have a hexagonal shape and the ballistic panel may cover an area to be protected in a uniform manner and without portions devoid of such elementary components.

According to yet another aspect of the disclosure, the area to be protected may substantially correspond to the entire area covered by the bulletproof vest so as to form a total shield for a user who wears it with minimum impediment to movement.

Finally, the bulletproof vest may comprise a containment lining for housing the ballistic panel, provided with suitable pockets and external fasteners, if any.

The characteristic features and advantages of the bulletproof protection structure and bulletproof vest according to the invention will be clear from the description, provided hereinbelow, of a non-limiting example of embodiment thereof provided with reference to the accompanying drawings.

BRIEF DESCRIPTION OF THE DRAWINGS

FIGS. 3A and 3B show in schematic form, respectively, a front view and enlarged view of a detail of a bulletproof protection structure realized according to an embodiment of the invention;

FIGS. 4A and 4B show in schematic form, respectively, a front view and enlarged view of a detail of an alternative embodiment of the bulletproof protection structure according to an embodiment of the invention;

DETAILED DESCRIPTION

Figure 1:
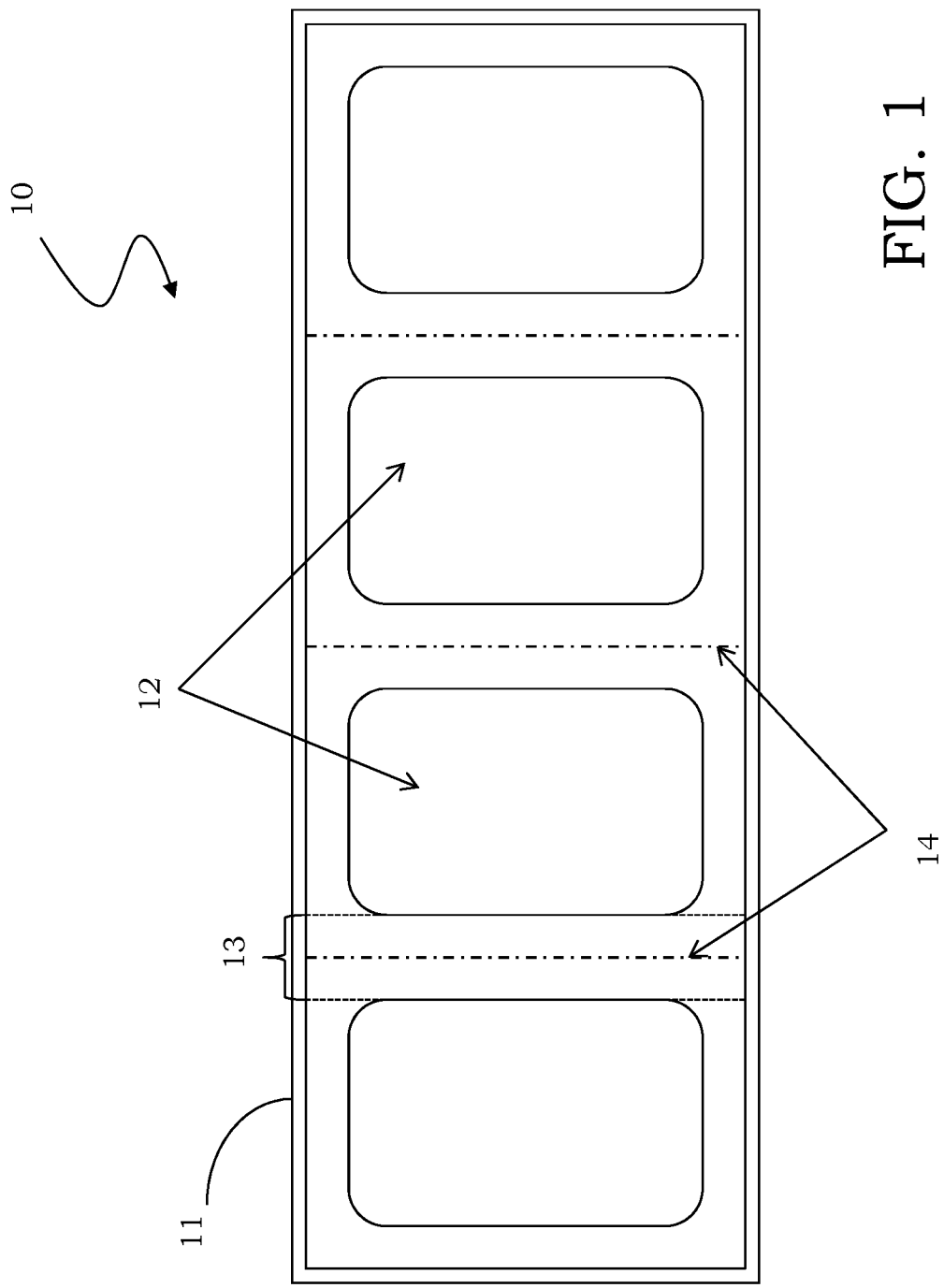
FIG. 1 shows in schematic form a bulletproof protection structure realized according to the prior art.
Figure 2A:
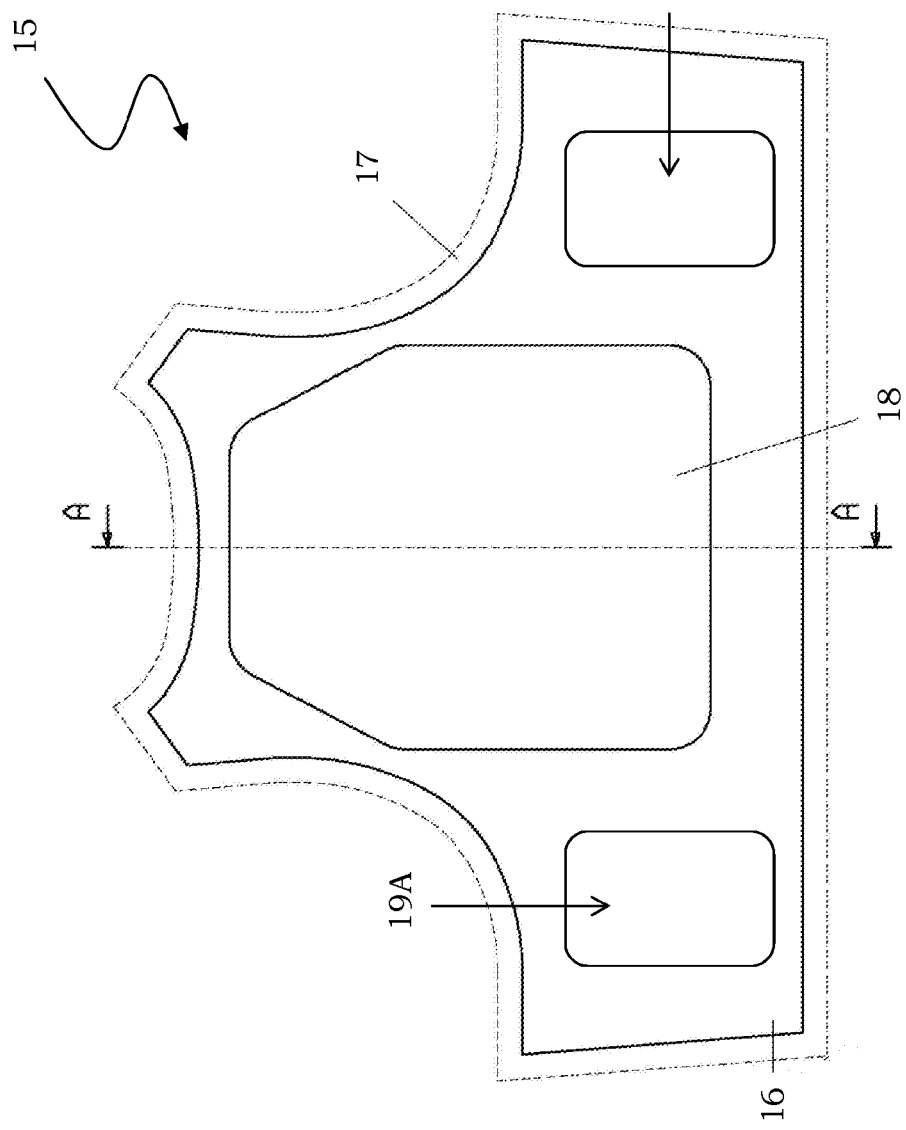
FIG. 2A shows in schematic form a front view of a bulletproof vest realized according to the prior art.
Figure 2C:
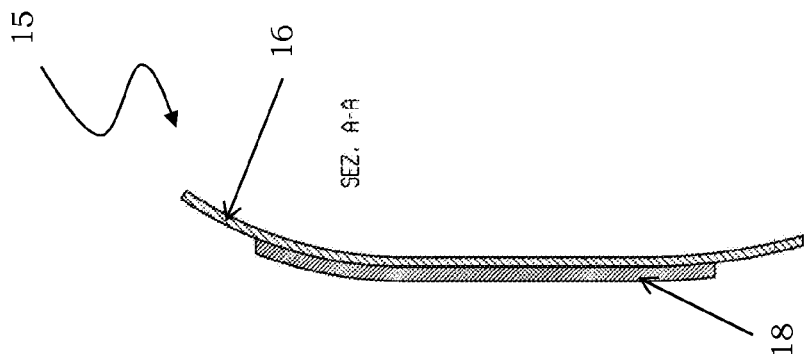
FIG. 2C shows in schematic form a cross-sectional view of a bulletproof vest realized according to the prior art.
Figure 2B:
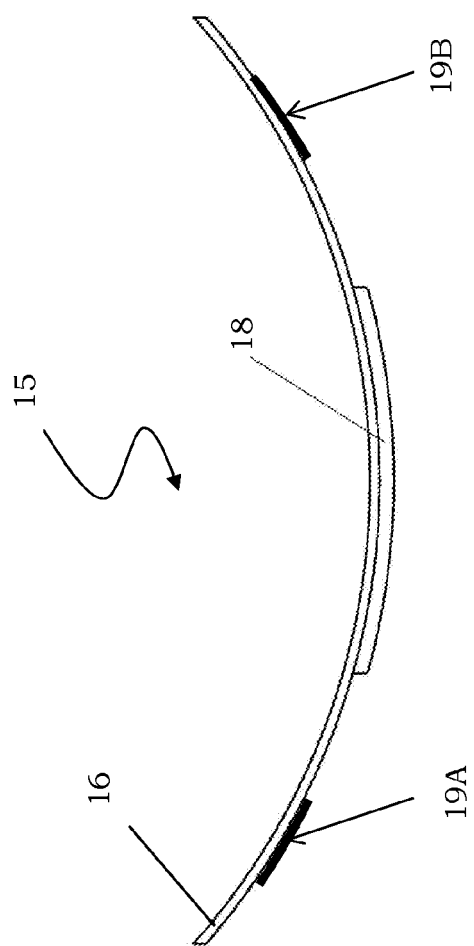
FIG. 2B shows in schematic form a view from above of a bulletproof vest realized according to the prior art.

Referring to the figures, a bulletproof protection structure, being illustrated schematically in FIG. 3A and denoted overall by 20, is described. The bulletproof protection structure 20 is in particular of the type suitable for ensuring effective bulletproof protection for calibers greater than 0.357 and 0.44 Magnum, namely higher than a level IIIa of the United States NU standard.

It should be pointed out that the figures show schematic views and are not drawn to scale, but are instead drawn so as to emphasize the main characteristic features of the invention. Moreover, in these figures, the different components are also shown in schematic form, whereby their form may vary depending on the desired application.

Moreover, the following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

The bulletproof protection structure 20 comprises a fabric portion 21, in particular made using high tenacity fibers, which are for example interwoven, or ballistic fabric. The ballistic fabric portion 21 is essentially a flexible base of the bulletproof protection structure 20. Alternatively, the ballistic fabric may comprise high molecular weight polyethylene.

In order to ensure a bulletproof protection for calibers greater than 0.357 and 0.44 Magnum, namely higher than a level IIIa of the United States NIJ standard, the bulletproof protection structure 20 is also provided with a ballistic panel 22 associated with the ballistic fabric portion 21 for example by means of gluing or by means of providing a containment lining or suitable pockets formed therein. The ballistic panel 22 thus forms a structure for reinforcing the flexible base of the bulletproof protection structure 20.

Suitably according to an embodiment of the invention, the ballistic panel 22 is finely divided into a plurality of elementary components 23 having a surface extension smaller than that of the ballistic panel 22, in particular less than 20% of the surface extension of this ballistic panel 22. In particular, the number of the elementary components 23 is sufficient to achieve a complete coverage of an area to be protected AP.

Moreover, the elementary components 23 are conveniently made so as to be structurally independent and individually associated with the ballistic fabric portion 21 so that they are adjacent and thus form a ballistic panel 22 finely divided into said elementary components 23. It is emphasized that the elementary components 23 are suitably structured so as to reduce to a minimum, or even eliminate, the portions of the area to be protected AP which are left exposed, namely do not have elementary components 23.

Moreover, suitably according to an embodiment of the invention, the elementary components 23 are associated with the ballistic fabric portion 21 in correspondence with their surfaces of greater extension, while the sides, indicated for example by 23s in FIG. 3B, are substantially devoid of means for fastening them to the adjacent elementary components. This allows a movement of these elementary components 23 in a plane Z perpendicular to the plane defined by the ballistic panel 22, which is essentially at right angles to the sheet on which the bulletproof protection structure 20 is illustrated.

It is possible to equip the elementary components 23 into which the ballistic panel 22 is finely divided with tiles; these elementary components 23, in fact, cover the area to be protected AP in the same way that normal building tiles would cover a floor or a wall. In the case of the bulletproof protection structure 20, this floor or wall is in reality a flexible substrate formed by the ballistic fabric portion 21, and the elementary components 23 in the manner of tiles are able to follow any deformations thereof, for example in the case where it is required to provide bulletproof covering structures for irregular surfaces.

In this way, the ballistic panel 22 finely divided up into the elementary components 23 and associated with the ballistic fabric portion 21, and therefore the bulletproof protection structure 20 thus formed, is a flexible structure. Hence, the bulletproof protection structure 20 may be used to cover surfaces or structures with an irregular form.

These elementary components 23 are made of a sintered material, such as aluminum oxide (ballistic ceramic) or carbides, such as silicon or boron carbide, materials which are normally used for the bulletproof protection of vehicles.

In an embodiment, the elementary components 23 are glued using a thermoplastic film onto fabrics made of high tenacity fibers or high molecular weight polyethylene. In this way, the bulletproof protection structure 20 comprises at least a thermoplastic film for associating the elementary components 23 with the flexible base 21 by gluing.

It is thus possible to obtain an assembly formed by the ceramic elementary components 23 and by the ballistic fabric portion 21, which is compact, but flexible and in particular able to cover and therefore protect an extensive surface over the entire area of the vest, being by far superior to the current standards.

The bulletproof protection structure 20 according to an embodiment of the invention is thus able to provide an efficient bulletproof protection for calibers greater than 0.357 and 0.44 Magnum, namely higher than a level IIIa of the United States NIJ standard; in particular, as seen in connection with the prior art, the bullet is reduced upon impact into fragments due to the extreme hardness of the elementary components 23 which form the ballistic panel 22, these fragments and therefore the energy of the bullet being therefore absorbed by the assembly of the ballistic panel 22 and the ballistic fabric portion 21, the latter also ensuring the desired retention of the fragments.

In the embodiment shown by way of example in FIGS. 3A and 3B, the elementary components 23 have a substantially rectangular shape, preferably square with a side 23a, and have a surface extension of less than 2%, in particular about 1% of, the surface extension of the ballistic panel 22.

As described, the square elementary components 23 are associated, for example glued, together with the ballistic fabric portion 21 in correspondence with their surfaces of greater extension, but not with each other, in particular along their edges or sides 23s.

It is therefore immediately evident that the bulletproof protection structure 20 shown in FIG. 3A may be easily folded along vertical folding lines 24a or horizontal folding lines 24b, as per the local reference shown in the figure. The vertical and horizontal directions correspond in fact to the directions defined by the sides 23a of the elementary components 23 and therefore also to their possible inclinations with respect to each other, namely to the two degrees of freedom of these square elementary components 23.

The bulletproof protection structure 20 thus obtained allows also structures with corners to be covered, avoiding the presence of portions which do not have the reinforcement provided by the ballistic panel 22 and which therefore offer a smaller degree of protection, namely that solely of the ballistic fabric portion 21, as was the case in the known solutions.

In another embodiment, schematically shown in FIGS. 4A and 4B, the ballistic panel 22 is finely divided into a plurality of elementary components 23 having a hexagonal shape, with a side 23s, and have a surface extension of less than 2%, in particular equal to about 0.8%, of the surface extension of the ballistic panel 22.

In this case also, the hexagonal elementary components 23 are associated, for example glued, together with the ballistic fabric portion 21 in correspondence with their surfaces of greater extension, but not to each other, in particular along their edges or sides 23s.

Suitably, this alternative embodiment of the ballistic panel 22 finely divided into hexagonal elementary components 23 introduces two further degrees of freedom into the movement of these components (compared to components with a square shape) and therefore of the ballistic fabric portion 21 with which they are associated.

It is emphasized that also in this case it is possible to obtain a bulletproof protection structure 20 which may be easily folded along substantially vertical or horizontal folding lines, as per the local reference lines shown in the figure (where only one vertical folding line 24a is shown). Suitably, the bulletproof protection structure 20 according to this embodiment, is also able to be folded along substantially inclined folding lines, such as the line 24c shown in FIG. 4A.

It is therefore clear that the bulletproof protection structure according to this preferred embodiment allows also to cover surfaces or structures with a highly irregular form, which may be followed in different directions thanks to the relative inclination of the hexagonal elementary components 23.

In another embodiment hexagonal elementary components 23 with sides 23s having a length of between 10 mm and 50 mm, preferably equal to 20 mm or 30 mm, normally indicated as having a key dimension 20 or a key dimension 30, respectively, are used.

Figure 5A:
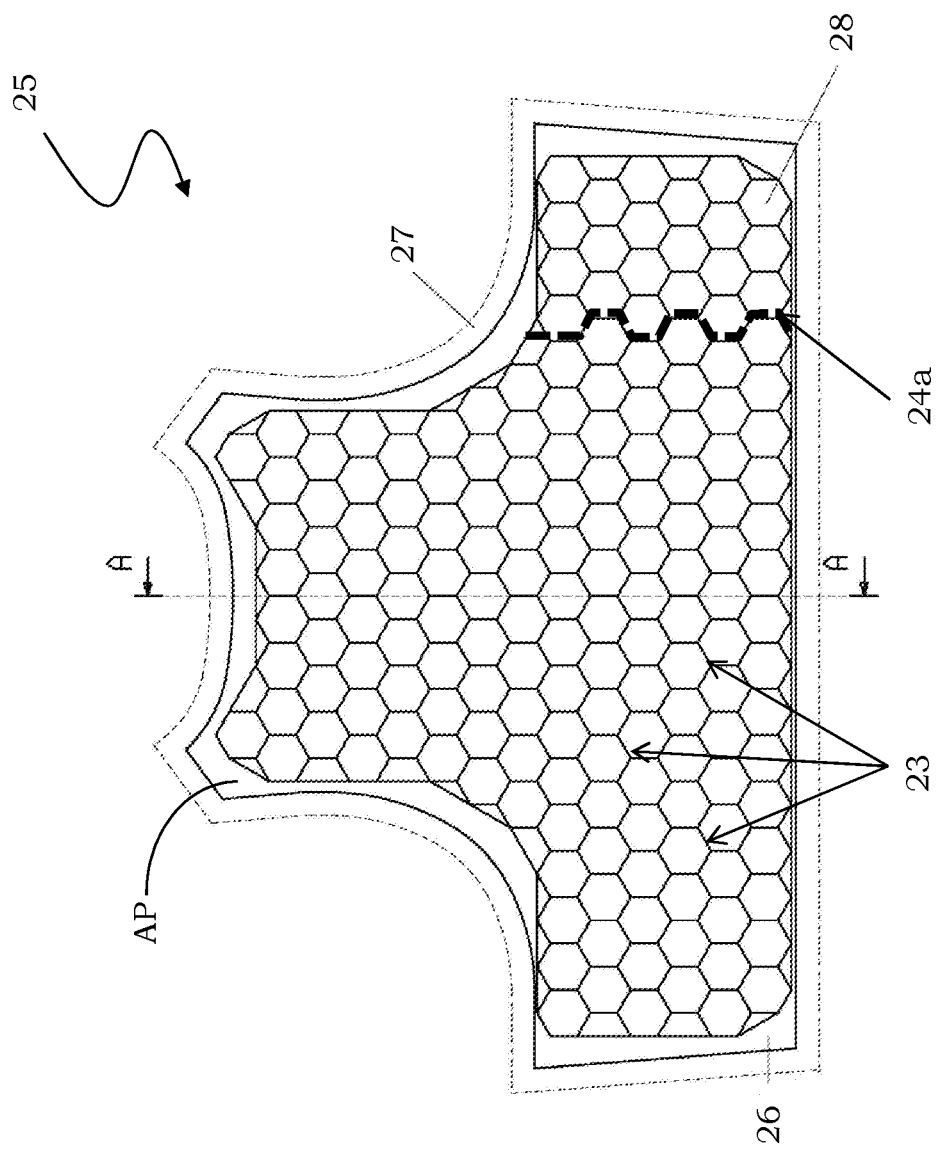
FIG. 5A shows in schematic form a front view of a bulletproof vest realized according to an embodiment of the invention.
Figure 5C:
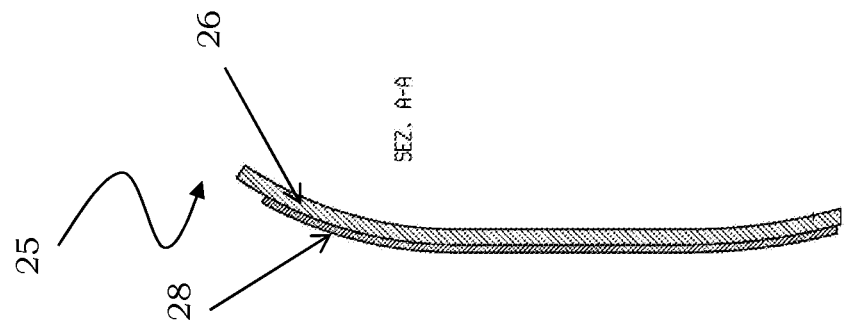
FIG. 5C shows in schematic form a cross-sectional view of a bulletproof vest realized according to an embodiment of the invention.
Figure 5B:
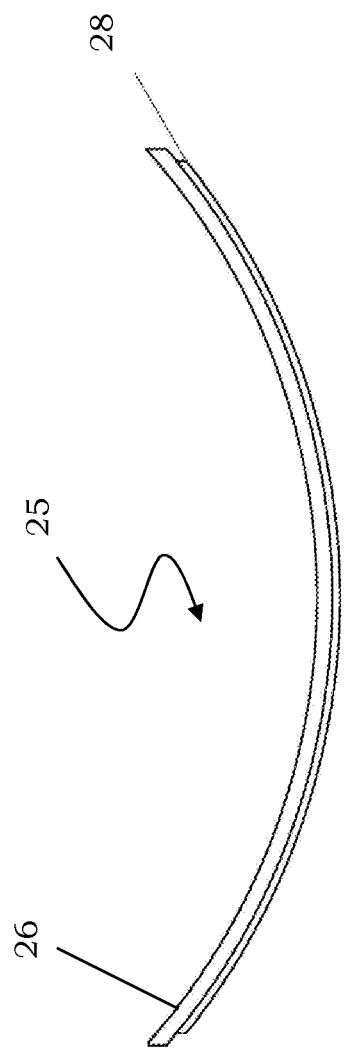
FIG. 5B shows in schematic form a view from above of a bulletproof vest realized according to an embodiment of the invention.

Suitably it is possible to use elementary components 23 with a hexagonal shape in order to provide a bulletproof vest able to ensure bulletproof protection for calibers greater than 0.357 and 0.44 Magnum, namely higher than a level IIIa of the United States NIJ standard, over practically the whole of its surface, while ensuring a high degree of wearability for the user wearing it. A front view of this bulletproof vest, denoted overall by 25, is schematically shown in FIG. 5A. Further views from above and cross-sectioned along the lines AA are instead shown in FIGS. 5B and 5C, respectively. This bulletproof vest is substantially in the form of a waistcoat. It is obviously possible to provide a form which is different, but can be likewise worn by a user.

As seen in connection with the prior art, the bulletproof jacket 25 comprises a ballistic fabric portion 26, in particular made of high tenacity fibers, which are for example interwoven, inserted inside a containing lining 27, if any.

In order to ensure bulletproof protection for calibers greater than 0.357 and 0.44 Magnum, namely higher than a level IIIa of the United State NIJ standard, the bulletproof vest 25 comprises at least one reinforcing structure, in particular a ballistic panel 28 associated with the ballistic fabric portion 26.

Suitably, the ballistic panel 28 is finely divided into a plurality of elementary components 23 having a surface extension smaller than that of the ballistic panel 28, in particular less than 20% of the surface extension of this ballistic panel 28. More in particular, the number of the elementary components 23 is sufficient to achieve a complete coverage of an area to be protected AP.

In this case, the area to be protected AP substantially corresponds to the entire area covered by the bulletproof vest 25 such as to ensure a bullet protection of a high level, in particular for calibers greater than 0.357 and 0.44 Magnum, namely higher than a level IIIa of the United States NIJ standard, i.e. a practically total protection of the user wearing said vest.

As shown in the figures, the ballistic panel 28 is thus made so as to cover practically the whole of the chest, the side flanks and also the back (not shown) of the user wearing the bulletproof vest 25, following the form also of the portions in the region of the armpits, below the throat and around the shoulders. This ballistic panel 28 constitutes in this way a total shield for the user wearing the bulletproof vest 25.

In other words, according to an embodiment of the invention, the bulletproof vest 25 provided with a ballistic panel 28 formed using a plurality elementary components 23, in particular with a hexagonal shape, is suitably flexible and designed to be worn in any situation, ensuring a sufficient freedom of movement in any direction of the user wearing it.

It is emphasized that the hexagonal shape of the elementary components 23 into which the ballistic panel 22 is finely divided allows the maximum degree of freedom for the bulletproof vest 25 which comprises the ballistic fiber portion 26 and the ballistic panel 22 thus formed, in particular ensuring a correct covering of the body of the user wearing it, thus minimizing at the same time the impediment to movement of said user.

It is also emphasized that, conveniently, the bulletproof vest 25 according to an embodiment of the invention may be provided with the containment lining 27 so as to form suitable pockets and fasteners, a personalization thereof also being possible depending on the applications, for example depending on the military corps or security company that will make use of it.

The bulletproof vest 25 could also comprise a bottom protection portion (not shown), in the form for example of another strip provided with elementary reinforcing components able to pass between the legs of the user wearing it.

To conclude, the bulletproof protection structure according to the embodiments of the invention is able to provide effective bulletproof protection for calibers greater than 0.357 and 0.44 Magnum, namely higher than a level IIIa of the United States NIJ standard in a final structure which is sufficiently flexible to be able to cover also irregular surfaces.

For example, it is possible to imagine that a bulletproof protection structure of the shown type may cover the hood of a vehicle such as a Jeep® and not only its lateral sides as in the known solutions.

The bulletproof protection structure according to an embodiment of the invention is conveniently able to allow an increase in the level of protection up to calibers such as those of the AK47 rifle and M2AP ammunition; it is possible, moreover, by increasing the thicknesses both of the ballistic fabric portion and of the elementary components into which the ballistic panel is finely divided, to provide protection also for very large calibers such as those of the Dragunov or SVD rifles (SVD, acronym for Russian "Snayperskaya Vintovka Dragunova").

Furthermore, it is emphasized that the use of the elementary components to form the ballistic panel of such a structure allows a reduction to the minimum, or even an elimination, of the portions of the area to be protected which are left exposed, namely do not have elementary reinforcing components, while ensuring the flexibility and therefore the possibility of folding the final structure obtained.

Moreover, thanks to the use of a ballistic panel which is finely divided into a plurality of elementary components or tiles suitably attached only in correspondence with their surfaces of maximum extension and not along their edges or sides, it is possible to provide a bulletproof vest which remains flexible, but ensures a bulletproof protection for calibers greater than 0.357 and 0.44 Magnum, namely higher than a level IIIa of the United States NIJ standard, the flexible ballistic fabric portion being combined with these elementary components made of ballistic ceramic.

Suitably, the bulletproof vest according to an embodiment of the invention is able to protect more extensive surfaces (in particular different parts of the body), compared to the known solutions, while ensuring the flexibility of the vest as a whole and therefore a greater comfort for the person wearing it.

In fact, the user who wears such a bulletproof vest is not impeded in his/her movements, despite the fact that the area to be protected is maximized so that it substantially corresponds to the entire area covered by said vest.

It is pointed out that it is possible to envisage elementary components having a shape different from those shown, such as a circular or oval shape. The bulletproof protection structure itself could also have a form different from the rectangular form shown and could comprise several portions, each provided with a ballistic panel divided into a plurality of elementary components.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A bulletproof protection structure comprising:
a flexible base made of ballistic fabric; and
a reinforcing structure the reinforcing structure formed by means of at least one ballistic panel attached to the flexible base,
wherein the ballistic panel is finely divided into a plurality of elementary components, the elementary components individually attached to the flexible base, structurally independent of one another and not bound to each other, so as to ensure a flexibility for the bulletproof protection structure as a whole and freedom of movement of the elementary components in multiple degrees of freedom,
wherein the elementary components have a hexagonal shape, whereby the individual attachment of the elementary components to the flexible base, structurally independent of one another and not bound to each other, with the hexagonal shape provides multiple degrees of freedom,
wherein the elementary components are associated with the flexible base in correspondence with at least a surface of maximum extension thereof,
wherein the elementary components each have an area smaller than a surface extension of the ballistic panel by less than 2% of the surface extension of the ballistic panel,
and wherein the elementary components are in the form of flat tiles having said hexagonal shape.

2. The bulletproof protection structure of claim 1, wherein the elementary components are attached to the flexible base at locations on at least a surface of maximum extension thereof.

3. The bulletproof protection structure of claim 1, wherein the elementary components each have an area smaller than a surface extension of the ballistic panel, equal to about 0.8% of the surface extension of the ballistic panel.

4. The bulletproof protection structure of claim 1, wherein the plurality of elementary components comprise a number of the elementary components sufficient to achieve a substantially complete coverage of an area to be protected by means of the ballistic panel.

5. The bulletproof protection structure of claim 1, able to cover surfaces or structures having an irregular form.

6. The bulletproof protection structure of claim 1, wherein the elementary components are made of a sintered material selected from the group consisting of aluminum oxide and carbides.

7. The bulletproof protection structure of claim 1, wherein the elementary components having the hexagonal shape introduces two further degrees of freedom into the movement of these components as compared to degrees of freedom from components with a square shape.

8. The bulletproof protection structure of claim 7, wherein the elementary components have sides with a length of between 10 mm and 50 mm.

9. The bulletproof protection structure of claim 7, wherein the elementary components have sides with a length between 10 mm and 50 mm.

10. The bulletproof protection structure of claim 1, comprising at least a thermoplastic film for the attachment of the elementary components with the flexible base by gluing.

11. The bulletproof protection structure of claim 1, wherein the ballistic fabric comprises fibers selected from high tenacity fibers and high molecular weight polyethylene.

12. A bulletproof protection structure comprising:
a flexible base made of ballistic fabric;
a reinforcing structure the reinforcing structure formed by means of at least one ballistic panel attached to the flexible base,
wherein the ballistic panel is finely divided into a plurality of elementary components, the elementary components individually attached to the flexible base, structurally independent of one another and not bound to each other, so as to ensure a flexibility for the bulletproof protection structure as a whole and freedom of movement of the elementary components in multiple degrees of freedom; and
a thermoplastic film for the attachment of the elementary components with the flexible base by gluing at locations on at least a surface of maximum extension of the elementary components,
wherein the elementary components have a hexagonal shape, whereby the individual attachment of the elementary components to the flexible base, structurally independent of one another and not bound to each other, with the hexagonal shape provides two multiple degrees of freedom,
wherein the elementary components each have an area smaller than a surface extension of the ballistic panel by less than 2% of the surface extension of the ballistic panel,
and wherein the elementary components are in the form of flat tiles having said hexagonal shape.

13. The bulletproof protection structure of claim 12,
wherein the plurality of elementary components comprise a number of the elementary components sufficient to achieve a substantially complete coverage of an area to be protected by means of the ballistic panel, the bulletproof protection structure able to cover surfaces or structures having an irregular form,
wherein the elementary components are made of a sintered material selected from the group consisting of aluminum oxide and carbides, and the ballistic fabric comprises fibers selected from high tenacity fibers and high molecular weight polyethylene,
wherein the elementary components have a hexagonal shape and have sides with a length of between 10 mm and 50 mm, the hexagonal shape introducing two further degrees of freedom into the movement of these components as compared to degrees of freedom from components with a square shape.

14. The bulletproof protection structure of claim 12, wherein the elementary components each have an area smaller than a surface extension of the ballistic panel equal to about 0.8% of the surface extension of the ballistic panel.

15. A bulletproof vest comprising:
a flexible base made of ballistic fabric; and
a reinforcing structure the reinforcing structure formed by means of a ballistic panel attached to the flexible base forming a bulletproof protection structure,
wherein the ballistic panel is finely divided into a plurality of elementary components, the elementary components individually attached to the flexible base, structurally independent of one another and not bound to each other, so as to ensure a flexibility for the bulletproof protection structure as a whole and freedom of movement of the elementary components in multiple degrees of freedom,
wherein the elementary components have a hexagonal shape, whereby the individual attachment of the elementary components to the flexible base, structurally independent of one another and not bound to each other, with the hexagonal shape provides multiple degrees of freedom,
wherein the elementary components are associated with the flexible base in correspondence with at least a surface of maximum extension thereof,
wherein the elementary components each have an area smaller than a surface extension of the ballistic panel by less than 2% of the surface extension of the ballistic panel,
and wherein the elementary components are in the form of flat tiles having said hexagonal shape.

16. The bulletproof vest of claim 15, wherein the elementary components are attached to the flexible base at locations on at least a surface of maximum extension thereof.

17. The bulletproof vest of claim 15, wherein the elementary components each have an area smaller than a surface extension of the ballistic panel, equal to about 0.8% of the surface extension of the ballistic panel.

18. The bulletproof vest of claim 15, wherein the plurality of elementary components comprise a number of the elementary components sufficient to achieve a substantially complete coverage of an area to be protected by means of the ballistic panel.

19. The bulletproof vest of claim 15, wherein the elementary components are made of a sintered material selected from the group consisting of aluminum oxide and carbides.

20. The bulletproof vest of claim 15, wherein the elementary components having the hexagonal shape introduces two further degrees of freedom into the movement of these components as compared to degrees of freedom from components with a square shape.

21. The bulletproof vest of claim 20, wherein the ballistic panel covers an area to be protected in a uniform manner and without portions devoid of the elementary components.

22. The bulletproof vest of claim 21, wherein the area to be protected substantially corresponds to the entire extension of the bulletproof vest so as to form a total shield for a user who wears it with minimum impediment to movement.

23. The bulletproof vest of claim 20, wherein the elementary components have sides with a length of between 10 mm and 50 mm.

24. The bulletproof vest of claim 15, comprising at least a thermoplastic film for the attachment of the elementary components with the flexible base by gluing.

25. The bulletproof vest of claim 15, wherein the ballistic fabric comprises fibers selected from high tenacity fibers and high molecular weight polyethylene.

26. The bulletproof vest of claim 15, further comprising a containment lining for housing the ballistic panel.

27. The bulletproof vest of claim 26, wherein the containment lining is provided with suitable pockets and external fasteners.

* * * * *

UNITED STATES PATENT AND TRADEMARK OFFICE
CERTIFICATE OF CORRECTION

PATENT NO. : 10,473,433 B2
APPLICATION NO. : 14/967859
DATED : November 12, 2019
INVENTOR(S) : Alberto Contri It is certified that error appears in the above-identified patent and that said Letters Patent is hereby corrected as shown below:

In the Claims

Claim 12, Column 11, Line 34, please delete the word "two".

Signed and Sealed this
Fourteenth Day of January, 2020

Andrei Iancu
*Director of the United States Patent and Trademark Office*